United States Patent
Davis et al.

(10) Patent No.: US 7,451,197 B2
(45) Date of Patent: Nov. 11, 2008

(54) METHOD, SYSTEM, AND ARTICLE OF MANUFACTURE FOR NETWORK PROTOCOLS

(75) Inventors: Arlin R. Davis, Yamhill, OR (US); Rajesh S. Madukkarumukumana, Hillsboro, OR (US); Stan C. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 10/448,797

(22) Filed: May 30, 2003

(65) Prior Publication Data

US 2004/0243723 A1    Dec. 2, 2004

(51) Int. Cl.
 *G06F 15/177*    (2006.01)

(52) U.S. Cl. .............. 709/220; 709/227; 709/250; 719/312

(58) Field of Classification Search .......... 709/250, 709/220, 227; 719/312
See application file for complete search history.

(56) References Cited

U.S. PATENT DOCUMENTS

| | | | |
|---|---|---|---|
| 6,721,806 B2* | 4/2004 | Boyd et al. ............... | 719/312 |
| 2003/0140124 A1* | 7/2003 | Burns ....................... | 709/220 |
| 2004/0054813 A1* | 3/2004 | Boucher et al. ............ | 709/250 |
| 2004/0210320 A1* | 10/2004 | Pandya ...................... | 700/1 |
| 2006/0123123 A1* | 6/2006 | Kim et al. .................. | 709/227 |

OTHER PUBLICATIONS

Frost, J., "Windows Sockets: A Quick and Dirty Primer", [online], modified Dec. 31, 1999, [Retrieved on Mar. 24, 2004]. Retrieved from the Internet at <URL: http://worlds.std.com/~jimf/papers/sockets/winsock.html>.
Information Sciences Institute, "Internet Protocol", *DARPA Internet Program Protocol Specification*, [online], RFC 791, Sep. 1981, pp. 1-44, [Retrieved on Mar. 24, 2004]. Retrieved from the Internet at <URL: http://www.faqs.org/rfcs/rfc791.html>.
Information Sciences Institute, "Transmission Control Protocol", *DARPA Internet Program Protocol Specification*, [online], RFC 793, Sep. 1981, pp. 1-84, [Retrieved on Mar. 24, 2004]. Retrieved from the Internet at <http://www.faqs.org/rfcs/rfc793.html>.
U.S. Appl. No. 10/637,370, filed Aug. 7, 2003, entitled "Method, System, and Article of Manufacture for Utilizing Host Memory From an Offload Adapter", invented by R. S. Madukkarumukumana, & J. Ni.

(Continued)

*Primary Examiner*—Nathan J. Flynn
*Assistant Examiner*—Kyung H Shin
(74) *Attorney, Agent, or Firm*—Konrad Raynes & Vector LLP; Rabindranath Dutta (57) ABSTRACT

Provided are a method, system, and article of manufacture. A network communication request is received at an offload application, wherein the offload application interfaces with a first network stack implemented in an operating system and a second network stack implemented in a hardware device. A determination is made if the network communication request can be processed by the second network stack. If the network communication request can be processed by the second network stack, then the network communication request is offloaded for processing to the hardware device.

20 Claims, 5 Drawing Sheets

OTHER PUBLICATIONS

U.S. Appl. No. 10/695,006, filed Oct. 27, 2003, entitled "Method, Apparatus, System, and Article of Manufacture for Processing Control Data by an Offload Adapter", invented by R. S. Madukkarumukumana, & J. Ni.

Yeh, E., H. Chao, V. Mannem, J. Gervais, and B. Booth, "Introduction to TCP/IP Offload Engine (TOE)", Version 1.0, Apr. 2002.

Declaration of Arlin R. Davis, dated Apr. 6, 2007.

Declaration of Rajesh S. Madukkarumukumana, dated Apr. 6, 2007.

Declaration of Stan C. Smith, dated Apr. 6, 2007.

Intel Corporation, "Linux System Software for Infiniband Architecture", Software Architecture Specification (SAS), Revision 1.0.1, Aug. 1, 2002, 94 pp.

* cited by examiner

METHOD, SYSTEM, AND ARTICLE OF MANUFACTURE FOR NETWORK PROTOCOLS

BACKGROUND OF THE INVENTION

1. Field of the Invention

The present invention relates to a method, system, and an article of manufacture for network protocols.

2. Description of the Related Art

A host system may have a network adapter coupled to the host system for network communications. In certain implementations, the network communications may require the processing of commands related to the Transmission Control Protocol/Internet Protocol (TCP/IP) or any other protocol implemented over IP. A protocol is a set of rules, data formats, and conventions that regulates the transfer of data between communicating processes.

The TCP/IP protocol may be implemented in software as a TCP/IP protocol stack as part of the operating system that is resident on the host system. In such a case, the central processing unit of the host system processes commands that are related to the TCP/IP protocol.

Some network adapters may provide hardware support for processing commands related to the TCP/IP protocol. Drivers for such network adapters may provide new interfaces for applications that use the TCP/IP protocol for network communications. Applications that work with network adapters that do not provide hardware support for the TCP/IP protocol stack may have to be rewritten to use the new interfaces. Furthermore, if the network adapter provides hardware support for the TCP/IP protocol stack, changes may be required to the existing TCP/IP protocol stack on the host system for offloading processing related to the TCP/IP protocol stack to the network adapter.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments. It is understood that other embodiments may be utilized and structural and operational changes may be made without departing from the scope of the present embodiments.

The embodiments describe an offloading application in a host system that supports network protocol offloading to a network interface card hardware. The offloading application can co-exist with the host operating system's network stack.

Figure 1:
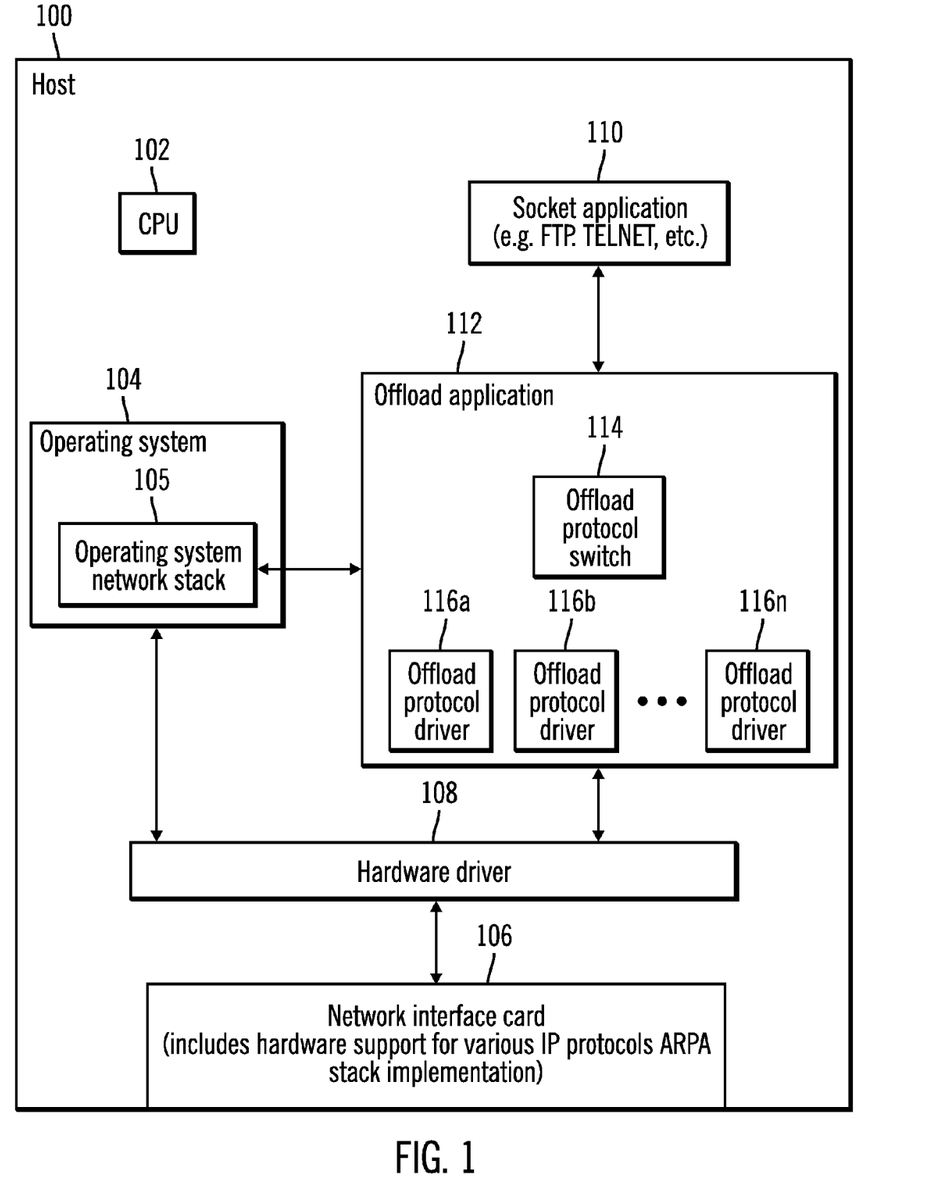
FIG. 1 illustrates a block diagram of a computing environment, in accordance with certain described embodiments of the invention.

FIG. 1 illustrates a block diagram of a computing environment, in accordance with certain described aspects of the invention. A host system 100 may comprise at least one CPU 102, an operating system 104, a network interface card (NIC) 106, a hardware driver 108, at least one socket application 110, and an offload application 112.

The host system 100 may be any computational device known in the art, such as a personal computer, a workstation, a server, a mainframe, a hand held computer, a palm top computer, a laptop computer, a telephony device, a network appliance, etc. The operating system 104 may be any operating system known in the art, such as, the UNIX* operating system, the Microsoft Windows* operating system, the LINUX operating system, etc. The operating system 104 includes an implementation of an operating system network stack 105 that can process commands related to the Internet protocol in software.

* Microsoft Windows is a trademark of Microsoft corp.; UNIX is a trademark of the Open Group.; AppleTalk is a trademark of Apple Computer, Inc.

The NIC 106 may include any network adapter known in the art that includes hardware support for processing at least some commands related to at least one IP protocol, such as, the TCP/IP protocol. For example, the NIC 106 may include a TCP offload engine adapter that implements a network stack in hardware or software. The hardware driver 108 provides a software interface for the NIC 106 such that the operating system 104 and applications resident on the host 100 can use the NIC 106.

The socket application 110 uses socket interfaces for network communications. The socket application may include Internet protocol based applications, such as, the File Transfer Protocol (FTP), TELNET etc. The socket application 110 generates socket calls for network communications to the offload application 112.

The offload application 112 includes an offload protocol switch 114 and one or more offload protocol drivers 116a, 116b, ... 116n that support various networking protocols. The offload protocol switch 114 determines if the NIC 106 provides hardware support for processing the network communications related to a socket call. If so, the offload protocol switch 114 forwards the socket call to the appropriate offload protocol driver 116a ... 116n for processing. The offload protocol driver 116a ... 116n uses the hardware driver 108 to send the socket call to the NIC 106 for processing. If the offload protocol switch 114 determines that the NIC 106 does not provide support for processing the network communications related to the socket call, then the offload protocol switch 114 sends the socket call for processing via the operating system network stack 105 that is resident in the operating system 104. Embodiments may implement the offload application in software, hardware, or in both software and hardware.

Therefore FIG. 1 illustrates how the offload application 112 offloads socket calls for processing to the NIC 106, when the NIC 106 provides hardware support for processing of commands related to the Internet Protocol. When the socket calls are processed by the NIC 106 the load on the CPU 102 is reduced because the CPU 102 does not have to process the socket calls.

Figure 2:
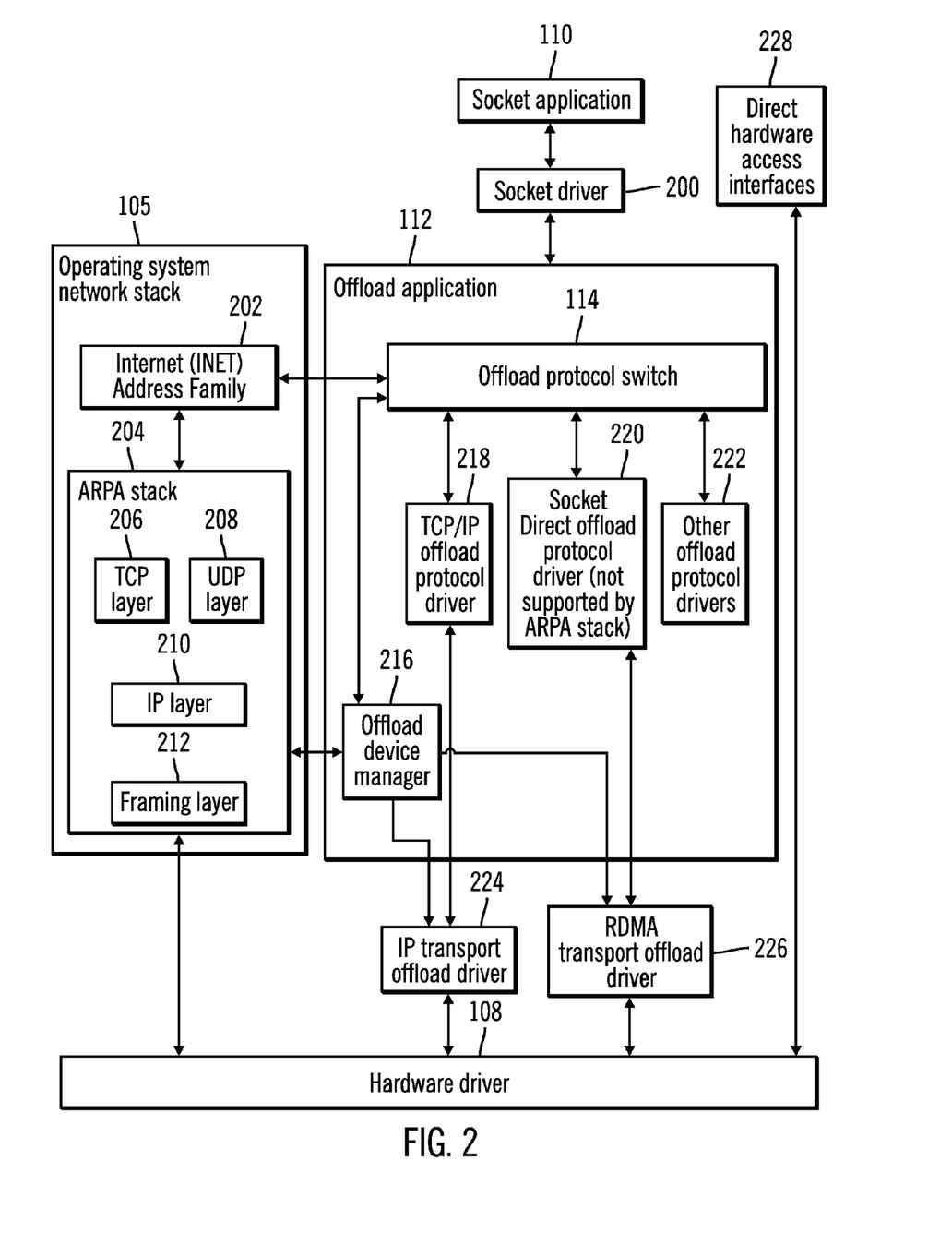
FIG. 2 illustrates a block diagram of interactions related to an offload application, in accordance with certain described embodiments of the invention.

FIG. 2,illustrates a block diagram of interactions related to the offload application 112, in accordance with certain embodiments of the invention. Socket based network programming is supported by a socket driver 200 that transmits socket calls from the socket application 110 to the offload application 112.

The operating system network stack 105 includes the Internet (INET) address family 202 and the ARPA stack 204. Sockets created by different programs use names to refer to one another. To be used, these names generally must be translated into addresses. The space that an address is drawn from is referred to as a domain. There are several domains for sockets of which the Internet address domain (AF_INET) is the UNIX implementation of the ARPA Internet standard protocols IP, TCP, and User Datagram Protocol (UDP). The INET address family 202 is the interface to the AF_INET domain.

The ARPA stack 204 comprises the TCP layer 206 and UDP layer 208 implemented over the IP layer 210 and the framing layer 212. The ARPA stack 204 implements the TCP/IP and the UDP/IP protocols in software. The TCP layer 206 implements the TCP protocols and the UDP layer 208 implements the UDP protocols. The IP layer 210 implements the IP protocols.

The offload application 112 includes the offload protocol switch 114, an offload device manager 216, a TCP/IP offload protocol driver 218, a socket direct offload protocol driver 220, and other protocol drivers 222.

The offload protocol switch 114 may handle multiple protocols in IP and routes sockets calls received from the socket application 110 via the socket driver 200 to the appropriate protocol. The offload protocol switch 114 may provide support both for protocols supported and not supported by the operating system network stack 105. For example, the offload protocol switch may provide hardware support for the TCP/IP protocol by directing calls to the TCP/IP offload protocol driver 218, where the TCP/IP protocol is also supported in software by the operating system network stack 105. Additionally, the offload protocol switch 114 may provide support to the socket direct offload protocol by directing socket calls related to the socket direct offload protocol to the socket direct offload protocol driver 220. The socket direct offload protocol may allow for remote direct memory access (RDMA) that is not supported by the operating system network stack 105. The offload protocol switch 114 may support still further IP protocols by directing socket calls to the other offload protocol drivers 222 besides the TCP/IP offload protocol drivers 218 and the socket direct offload protocol driver 220.

The offload device manager 216 interacts with the operating system network stack 105 and the offload protocol switch 114. The offload device manager 216 registers devices capable of providing hardware support for IP protocols. The offload device manager 216 may classify a received network event as an event that may be processed by the NIC 106 and generates corresponding events for offload transport drivers such as a IP transport offload driver 224 or an RDMA transport offload driver 226. The protocol drivers, such as, the TCP/IP offload protocol driver 218 and the socket direct offload protocol driver 220, may also transfer socket calls to corresponding transport drivers, such as, the IP transport offload driver 224 and the RDMA transport offload driver 226. The transport drivers, such as, the IP transport offload driver 224 and the RDMA transport offload driver 226 communicate with the NIC 106 via the hardware driver 108.

Additionally, the embodiments may include direct hardware access interfaces 228 that allow direct communication of applications resident on the host 100 with the NIC 106 via the hardware driver 108.

Therefore, FIG. 2 illustrates how the offload application 112 implemented in the host 100 supplements the operating system network stack 105 and provides hardware support of IP protocols via the NIC 106. Changes are not required to the operating system network stack 105 for implementing the offload application 112.

Figure 3:
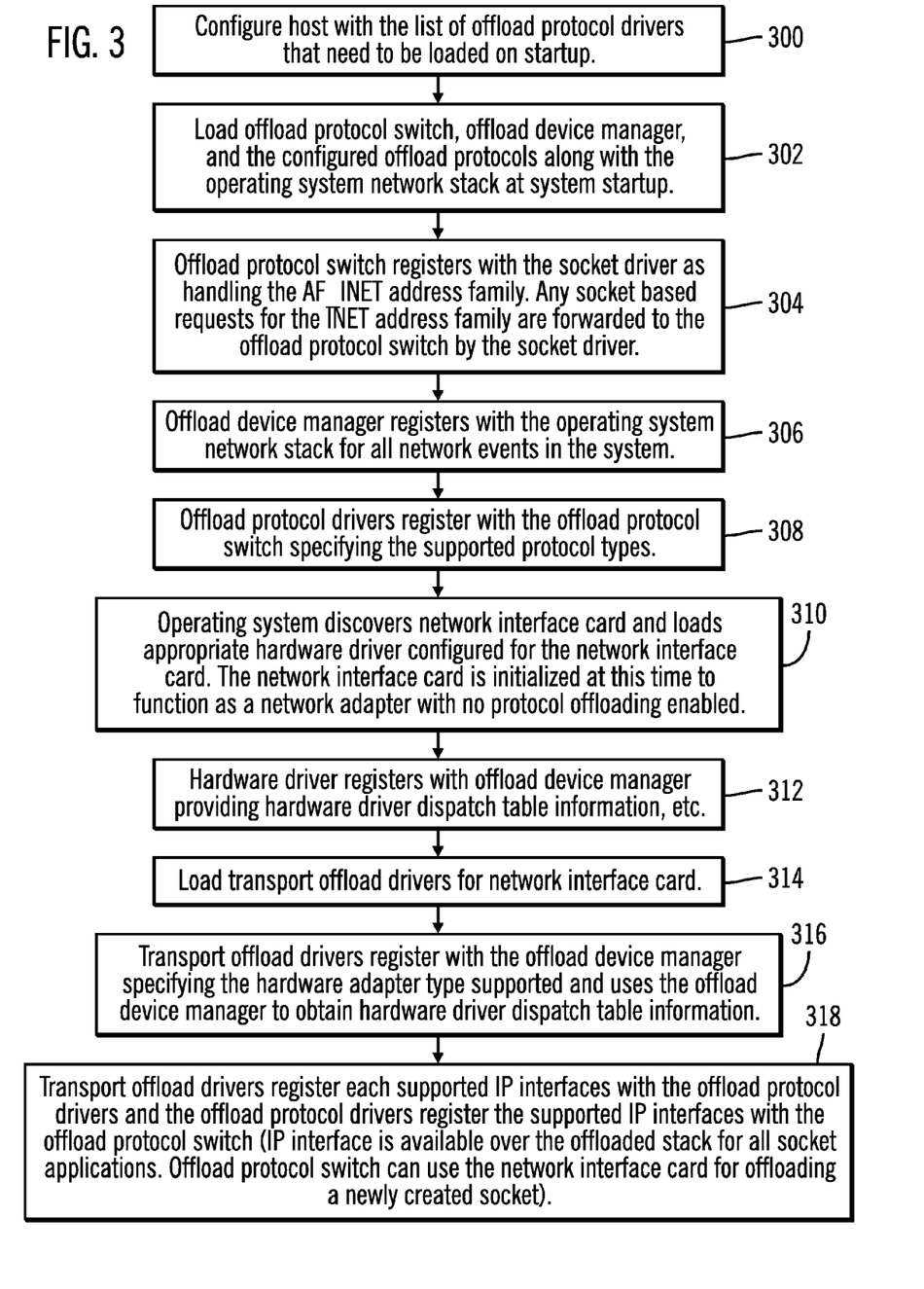
FIG. 3 illustrates logic for configuring an offload application, in accordance with certain described embodiments of the invention.

FIG. 3 illustrates logic for configuring the offload application 112 implemented in the host system 100, in accordance with certain embodiments of the invention.

The process starts at block 300 where the host 100 is configured with the list of offload protocol drivers, such as, the TCP/IP offload protocol driver 218 and the socket direct offload protocol driver 220, that need to be loaded on startup. Control proceeds to block 302, where during the startup of the host 100, the operating system 104 loads the operating system network stack 105. Along with the loading of the operating system network stack 105, the operating system 104 loads the offload protocol switch 114, the offload device manager 216 and the configured offload protocol drivers 218, 220, 222.

Control proceeds to block 304, where the offload protocol switch 114 registers with the socket driver 200 as handling the AF_INET address family. As a result, any socket based requests for the INET address family are forwarded to the offload protocol switch 114 by the socket driver 200. In alternative embodiments, the offload protocol switch 114 may handle additional address families besides the AF_NET address family.

Control proceeds to block 306, where the offload device manager 216 registers with the operating system network stack 105 for all network events in the system. At block 308, the offload protocol drivers 218, 220, 222 register with the offload protocol switch 114 and specify the supported protocol types to the offload protocol switch 114. The offload protocol drivers 218, 220, 222 may support protocols that are supported by the operating system network stack 105 and also support protocols that are not supported by the operating system network stack 105.

Control proceeds to block 310, where the operating system 104 discovers the NIC 106 and loads the appropriate hardware driver 108 configured for the NIC 106. The NIC 106 is initialized at this time to function as a network adapter that does not support any protocol stack offload. In alternative embodiments, a plurality of NICs or other hardware devices may be discovered by the operating system 104.

Control proceeds to block 312 where the hardware driver 108 registers with the offload device manager 216 and provides hardware dispatch table information, etc. At block 314 the operating system 104 loads the transport offload drivers 224, 226 for the NIC 106. Control proceeds to block 316, where the transport offload drivers 224, 226 register with the offload device manager 216 and specify the hardware adapter type supported. The transport offload drivers 224, 226 uses the offload device manager 216 to obtain the hardware dispatch table information.

Control proceeds to block 318, where the transport offload drivers 224, 226 register the supported interfaces with the offload protocol drivers 218, 220, 222 and the offload protocol drivers 218, 220, 222 register the supported interfaces with the offload protocol switch 114. At the completion of block 318, the IP interface is available over the offloaded stack for the socket application 110. The offload protocol switch 114 can use the NIC 106 for offloading a newly created socket. In alternative embodiments, the offload protocol switch 114 can use a plurality of NICs or other hardware devices for offloading one or more sockets.

Therefore, the logic of FIG. 3 illustrates how the IP interface at the NIC 106 is made available to the socket application 110 by the offload application 112.

Figure 4:
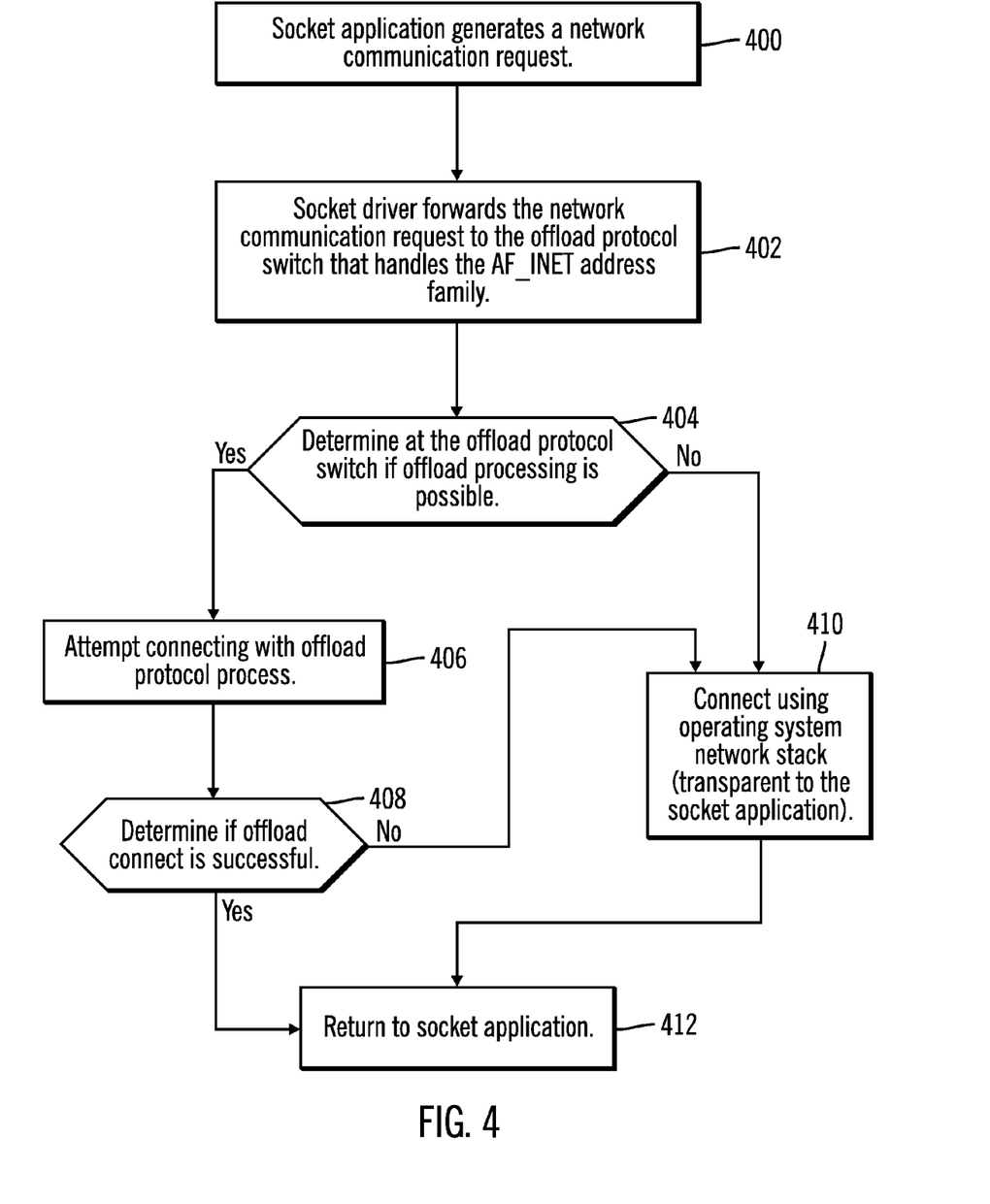
FIG. 4 illustrates logic for offloading the protocol stack, in accordance with certain described embodiments of the invention.

FIG. 4 illustrates logic for offloading the protocol stack that may be implemented in part via the offload application 112, in accordance with certain embodiments of the invention.

The process starts at block 400 where the socket application 110 generates a network communication request to the socket driver 200. The socket calls related to the network communication request may be from the AF_INET family. The AF_INET address family is for handling Internet protocols. Control proceeds to block 402, where the socket driver 200 forwards the network communication request to the offload protocol switch 114 that handles the AF_INET address family (the offload protocol switch 114 had registered with the socket driver 200 in block 304).

Control proceeds to block 404 where the offload protocol switch 114 determines whether offload processing is possible for the network communication request. If so, control proceeds to block 406 where offload application 112 attempts to connect to the NIC 106 for offloading the network communication request. For example, for a TCP/IP network communication request, the connection may be established from the offload application 112 to the NIC 106, via the offload protocol switch 114, the TCP/IP offload protocol driver 218, the IP transport offload driver 224 and the hardware driver 106. At block 408, the offload application 112 determines if the offloading of the network communication request is successful, i.e., the NIC 106 has processed the network communication request. If so, control is returned (at block 412) to the socket application 110.

If at block 408, the offload application 112 determines that the offloading of the communication request is unsuccessful, then control proceeds to block 410 where the network communication request is processed by the operating system network stack 105. Therefore, if for any reason the NIC 106 is unable to process the network communication request, such as, by generating a fault, then the operating system network stack 105 processes the network communication request in software by using the CPU 102.

If at block 404, the offload protocol switch 114 determines that offload processing is not possible for the network communication request then control proceeds to block 410 where the network communication request is processed by using the operating system network stack 105.

Therefore, the logic of FIG. 4 ensures that the socket application 110 does not have to be aware as to whether socket calls for network communication requests are processed by the NIC 106 or the operating system network stack 105. If a network communications request is capable of being processed by the NIC 106, then an acceleration of system performance may be expected when compared to the case where the network communication request is processed by the operating system network stack 105.

The embodiments, allow the offloading of network protocol processing to a hardware component, such as, a network interface card, thereby saving computational resources on the central processing unit of a host system. No changes are required to the existing network stack present in operating systems that reside on the host system. Socket application that run by using the operating system network stack 105 can run unchanged while using the hardware implementations of the network stack on the NIC 106. New capabilities like RDMA that are not supported by the ARPA stack may be supported by the embodiments. Furthermore, the embodiments may expose the same IP addresses on the operating system network stack 105 and the network stack on the NIC 106.

The embodiments preserve protocol port space across protocol processing modules in the NIC 106 and the host 100. Applications and network management utilities that run on the host 100 appear to interact with a single network stack even though two separate network stacks are maintained by the embodiments. The embodiments also provide support for session setup and connection control.

Additional Embodiment Details

The described techniques may be implemented as a method, apparatus or article of manufacture using standard programming and/or engineering techniques to produce software, firmware, micro-code, hardware or any combination thereof The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, DVD-ROMs, optical disks, etc.), volatile and non-volatile memory devices (e.g., EEPROMs, ROMs, PROMs, RAMs, DRAMs, SRAMs, flash, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Figure 5:
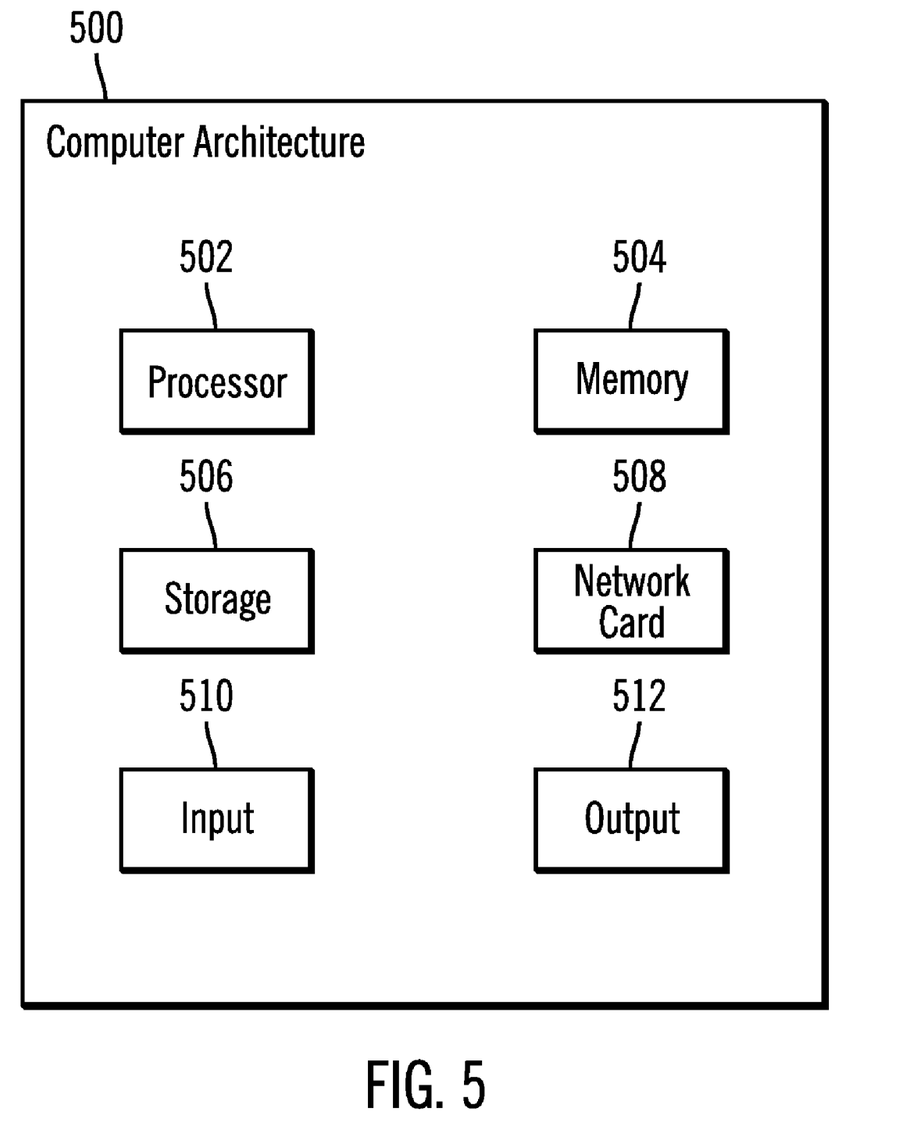
FIG. 5 illustrates a block diagram of a computer architecture in which certain described aspects of the invention are implemented.

FIG. 5 illustrates a block diagram of a computer architecture in which certain aspects of the invention are implemented. FIG. 5 illustrates one embodiment of the host system 100. The host system 100 may implement a computer architecture 500 having a processor 502 (such as the CPU 102), a memory 504 (e.g., a volatile memory device), and storage 506. The storage 506 may include non-volatile memory devices (e.g., EEPROMs, ROMs, PROMs, RAMs, DRAMs, SRAMs, flash, firmware, programmable logic, etc.), magnetic disk drives, optical disk drives, tape drives, etc. The storage 506 may comprise an internal storage device, an attached storage device or a network accessible storage device. Programs in the storage 506 may be loaded into the memory 504 and executed by the processor 502 in a manner known in the art. The architecture may further include a network card 508 (such as the NIC 106) to enable communication with a network. The architecture may also include at least one input 510, such as a keyboard, a touchscreen, a pen, voice-activated input, etc., and at least one output 512, such as a display device, a speaker, a printer, etc.

In certain implementations, the embodiments may be implemented in a computer system including a video controller to render information to display on a monitor coupled to the computer system including the offload application, such as a computer system comprising a desktop, workstation, server, mainframe, laptop, handheld computer, etc. Alternatively, the embodiments may be implemented in a computer system that does not include a video controller, such as a switch, router, etc.

While the embodiments have been described with respect to IP based protocols, other network protocols, such as, AppleTalk, etc.,. may also be supported by alterative embodiments. Furthermore, in additional embodiments more than one NIC may be used by the offload protocol switch for processing commands related to network communications.

The logic of FIG. 3 and FIG. 4 describes specific operations occurring in a particular order. Further, the operations may be performed in parallel as well as sequentially. In alternative embodiments, certain of the logic operations may be performed in a different order, modified or removed and still implement embodiments of the present invention. Morever, steps may be added to the above described logic and still conform to the embodiments. Yet further steps may be performed by a single process or distributed processes.

Furthermore, many of the software and hardware components have been described in separate modules for purposes of illustration. Such components may be integrated into fewer number of components or divided into larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    receiving a network communication request at an offload application, wherein the offload application interfaces with a first network stack implemented in an operating system and a second network stack implemented in a hardware device;
    determining if the network communication request can be processed by the second network stack; and
    if the network communication request can be processed by the second network stack, then offloading the network communication request for processing to the hardware device, wherein the first and second network stacks comprise an Internet address family and the TCP protocol implemented over an IP network layer, wherein the offload application offloads the network communication request to the second network stack in at least one protocol that is unsupported by the first network stack, and wherein a single stack behavior is maintained by the first and second network stacks to applications and network management utilities, wherein the offload application includes a plurality of offload protocol drivers, wherein a first protocol driver of the plurality of offload protocol drivers is a TCP/IP offload protocol driver, and a second protocol driver of the plurality of offload protocol drivers is a socket direct offload protocol driver, wherein the socket direct offload protocol driver allows for remote direct memory access (RDMA) that is not supported by the first network stack, wherein the network communication request is processed faster in the second network stack when compared to the first network stack, and wherein the network communication request is for session setup and connection control, wherein the first network stack in an operating system network stack, wherein the hardware device is a network interface card, the method further comprising:
    (i) configuring a host with a list of those offload protocol drivers that need to be loaded on startup, and loading an offload protocol switch, an offload device manager, and the offload protocol drivers along with the operating system network stack at system startup;
    (ii) registering the offload protocol switch with a socket driver as handling the Internet address family, wherein any socket based requests for the Internet address family are forwarded to the offload protocol switch by the socket driver, and registering the offload device manager with the operating system network stack for all network events, wherein the offload protocol drivers are registered with the offload protocol switch;
    (iii) discovering, by the operating system, the network interface card and loading an appropriate hardware driver configured for the network interface card, and configuring the network interface card to function with no protocol offloading enabled;
    (iv) registering the hardware driver with the offload device manager providing hardware dispatch table information, and loading transport offload drivers for the network interface card; and
    (v) registering the transport offload drivers with the offload device manager specifying the hardware adapter type supported, wherein the hardware driver dispatch table information is obtained from the offload device manager, wherein the transport offload drivers register each supported IP interfaces with the offload protocol driver, and registering by the offload protocol drivers the supported IP interfaces with the offload protocol switch.

2. The method of claim 1, wherein the offload application and the second network stack are implemented in hardware or software, and further comprising:
    if the network communication request cannot be processed by the second network stack, then processing the network communication request at the first network stack.

3. The method of claim 1, wherein the network interface card includes hardware support for at least one IP based protocol in the second network stack, further comprising:
    receiving the network communication request at the network interface card; and
    processing the network communication request by using the hardware support for the at least one IP based protocol, wherein protocol port space is preserved across protocol processing modules in the hardware device and the operating system.

4. The method of claim 1, wherein the offload application comprises the offload protocol switch, and wherein prior to receiving:
    generating the request via a socket application using a socket interface;
    receiving the request at a socket driver coupled to the offload application; and
    forwarding the request to the offload protocol switch from the socket driver.

5. The method of claim 1, further comprising:
    determining if the network communication request is successfully processed by the hardware device; and if the network communication request is not successfully processed by the hardware device, then sending the network communication request for processing to the first network stack.

6. The method of claim 1, wherein prior to offloading:
sending the network communication request to an IP transport offload driver coupled to a hardware driver for the hardware device; and
forwarding the network communication request from the IP transport offload driver to the hardware driver for offloading to the hardware device.

7. A system, comprising:
a hardware device;
an operating system;
an offload application coupled to the operating system to receive a network communication request;
a first network stack implemented in the operating system, wherein the offload application is configured to interface with the first network stack;
a second network stack implemented in the hardware device, wherein the offload application is configured to interface with the second network stack, wherein the offload application is configured to determine if the network communication request can be processed by the second network stack, and wherein the offload application is configured to offload the network communication request for processing to the hardware device if the network communication request can be processed by the second network stack, wherein the first and second network stacks comprise an Internet address family and the TCP protocol implemented over an IP network layer, wherein the offload application offloads the network communication request to the second network stack in at least one protocol that is unsupported by the first network stack, and wherein a single stack behavior is maintained by the first and second network stacks to applications and network management utilities, wherein the offload application includes a plurality of offload protocol drivers, wherein a first protocol driver of the plurality of offload protocol drivers is a TCP/IP offload protocol driver, and a second protocol driver of the plurality of offload protocol drivers is a socket direct offload protocol driver, wherein the socket direct offload protocol driver allows for remote direct memory access (RDMA) that is not supported by the first network stack, wherein the network communication request is processed faster in the second network stack when compared to the first network stack, and wherein the network communication request is for session setup and connection control, wherein the first network stack in an operating system network stack, wherein the hardware device is a network interface card, and wherein operations performed comprise:

(i) configuring the system with a list of those offload protocol drivers that need to be loaded on startup, and loading an offload protocol switch, an offload device manager and the offload protocol drivers along with the operating system network stack at system startup;

(ii) registering the offload protocol switch with a socket driver as handling the Internet address family, wherein any socket based requests for the Internet address family are forwarded to the offload protocol switch by the socket driver, and registering the offload device manager with the operating system network stack for all network events, wherein the offload protocol drivers are registered with the offload protocol switch;

(iii) discovering, by the operating system, the network interface card and loading an appropriate hardware driver configured for the network interface card, and configuring the network interface card to function with no protocol offloading enabled;

(iv) registering the hardware driver with the offload device manager providing hardware dispatch table information, and loading transport offload drivers for the network interface card; and (v) registering the transport offload drivers with the offload device manager specifying the hardware adapter type supported, wherein the hardware driver dispatch table information is obtained from the offload device manager, wherein the transport offload drivers register each supported IP interfaces with the offload protocol driver, and registering by the offload protocol drivers the supported IP interfaces with the offload protocol switch.

8. The system of claim 7, wherein the offload application and the second network stack are implemented in hardware or software, and wherein the network communication request is processed at the first network stack if the network communication request cannot be processed by the second network stack.

9. The system of claim 7, further comprising:
a hardware support implemented in the network interface card, wherein the hardware support is for at least one IP based protocol in the second network stack, wherein the network communication request is received at the network interface card, and wherein the network communication request is processed via a use of the hardware support for the at least one IP based protocol;
a plurality of processing modules implemented in the hardware device and the operating system, wherein protocol port space is preserved across the protocol processing modules.

10. The system of claim 7, wherein the offload application comprises the offload protocol switch, and further comprising:
a socket application to generate the request via a socket interface; and
a socket driver coupled to the offload application to receive the request and forward the request to the offload protocol switch.

11. The system of claim 7, wherein the offload application is configured to determine if the network communication request is successfully processed by the hardware device, and wherein the offload application is configured to send the network communication request for processing to the first network stack if the network communication request is not successfully processed by the hardware device.

12. The system of claim 7, further comprising:
a hardware driver for the hardware device;
an IP transport offload driver coupled to the hardware driver, wherein the network communication request is sent to the IP transport offload driver, and the network communication request is forwarded from the IP transport offload driver to the hardware driver to offload to the hardware device.

13. A system, comprising:
a processor;
a hardware device;
an operating system capable of execution via the processor;
a video controller to render graphics output via interactions with the operating system;
an offload application coupled to the operating system to receive a network communication request;

a first network stack implemented in the operating system, wherein the offload application is configured to interface with the first network stack; and a second network stack implemented in the hardware device, wherein the offload application is configured to interface with the second network stack, wherein the offload application is configured to determine if the network communication request can be processed by the second network stack, and wherein the offload application is configured to offload the network communication request for processing to the hardware device if the network communication request can be processed by the second network stack, wherein the first and second network stacks comprise an Internet address family and the TCP protocol implemented over an IP network layer, wherein the offload application offloads the network communication request to the second network stack in at least one protocol that is unsupported by the first network stack, and wherein a single stack behavior is maintained by the first and second network stacks to applications and network management utilities, wherein the offload application includes a plurality of offload protocol drivers, wherein a first protocol driver of the plurality of offload protocol drivers is a TCP/IP offload protocol driver, and a second protocol driver of the plurality of offload protocol drivers is a socket direct offload protocol driver, wherein the socket direct offload protocol driver allows for remote direct memory access (RDMA) that is not supported by the first network stack, wherein the network communication request is processed faster in the second network stack when compared to the first network stack, and wherein the network communication request is for session setup and connection control, wherein the first network stack in an operating system network stack, wherein the hardware device is a network interface card, and wherein operations performed comprise:

(i) configuring the system with a list of those offload protocol drivers that need to be loaded on startup, and loading an offload protocol switch, an offload device manager and the offload protocol drivers along with the operating system network stack at system startup;

(ii) registering the offload protocol switch with a socket driver as handling the Internet address family, wherein any socket based requests for the Internet address family are forwarded to the offload protocol switch by the socket driver, and registering the offload device manager with the operating system network stack for all network events, wherein the offload protocol drivers are registered with the offload protocol switch;

(iii) discovering, by the operating system, the network interface card and loading an appropriate hardware driver configured for the network interface card, and configuring the network interface card to function with no protocol offloading enabled;

(iv) registering the hardware driver with the offload device manager providing hardware dispatch table information, and loading transport offload drivers for the network interface card; and (v) registering the transport offload drivers with the offload device manager specifying the hardware adapter type supported, wherein the hardware driver dispatch table information is obtained from the offload device manager, wherein the transport offload drivers register each supported IP interfaces with the offload protocol driver, and registering by the offload protocol drivers the supported IP interfaces with the offload protocol switch.

14. The system of claim 13, further comprising:

a hardware support implemented in the network interface card, wherein the hardware support is for at least one IP based protocol in the second network stack, wherein the network communication request is received at the network interface card, and wherein the network communication request is processed via a use of the hardware support for the at least one IP based protocol; and a plurality of processing modules implemented in the hardware device and the operating system, wherein protocol port space is preserved across the protocol processing modules, wherein the offload application is configured to determine if the network communication request is successfully processed by the hardware device, and wherein the offload application is configured to send the network communication request for processing to the first network stack if the network communication request is not successfully processed by the hardware device.

15. A computer readable medium storinci instructions, wherein the instructions are capable of causing operations, the operations comprising:

receiving a network communication request at an offload application, wherein the offload application interfaces with a first network stack implemented in an operating system and a second network stack implemented in a hardware device;

determining if the network communication request can be processed by the second network stack; and if the network communication request can be processed by the second network stack, then offloading the network communication request for processing to the hardware device, wherein the first and second network stacks comprise an Internet address family and the TOP protocol implemented over an IP network layer, wherein the offload application offloads the network communication request to the second network stack in at least one protocol that is unsupported by the first network stack, and wherein a single stack behavior is maintained by the first and second network stacks to applications and network management utilities, wherein the offload application includes a plurality of offload protocol drivers, wherein a first protocol driver of the plurality of offload protocol drivers is a TCP/IP offload protocol driver, and a second protocol driver of the plurality of offload protocol drivers is a socket direct offload protocol driver, wherein the socket direct offload protocol driver allows for remote direct memory access (RDMA) that is not supported by the first network stack, and wherein the network communication request is processed faster in the second network stack when compared to the first network stack, and wherein the network communication request is for session setup and connection control, wherein the first network stack in an operating system network stack, wherein the hardware device is a network interface card, the operations further comprising:

(i) configuring a host with a list of those offload protocol drivers that need to be loaded on startup, and loading an offload protocol switch, an offload device manager and the offload protocol drivers along with the operating system network stack at system startup;

(ii) registering the offload protocol switch with a socket driver as handling the Internet address family, wherein any socket based requests for the Internet address family are forwarded to the offload protocol switch by the socket driver, and registering the offload device manager with the operating system network stack for all network events, wherein the offload protocol drivers are registered with the offload protocol switch;
(iii) discovering, by the operating system, the network interface card and loading an appropriate hardware driver configured for the network interface card, and configuring the network interface card to function with no protocol offloading enabled;
(iv) registering the hardware driver with the offload device manager providing hardware dispatch table information, and loading transport offload drivers for the network interface card; and
(v) registering the transport offload drivers with the offload device manager specifying the hardware adapter type supported, wherein the hardware driver dispatch table information is obtained from the offload device manager, wherein the transport offload drivers register each supported IP interfaces with the offload protocol driver, and registering by the offload protocol drivers the supported IP interfaces with the offload protocol switch.

16. The computer readable medium of claim 15, wherein the offload application and the second network stack are implemented in hardware or software, the operations further comprising:
processing the network communication request at the first network stack if the network communication request cannot be processed by the second network stack.

17. The computer readable medium of claim 15, wherein the network interface card includes hardware support for at least one IP based protocol in the second network stack, the operations further comprising:
receiving the network communication request at the network interface card; and
processing the network communication request by using the hardware support for the at least one IP based protocol, wherein protocol port space is preserved across protocol processing modules in the hardware device and the operating system.

18. The computer readable medium of claim 15, wherein the offload application comprises the offload protocol switch, and wherein prior to receiving:
generating the request via a socket application using a socket interface;
receiving the request at a socket driver coupled to the offload application;
forwarding the request to the offload protocol switch from the socket driver.

19. The computer readable medium of claim 15, the operations further comprising:
determining if the network communication request is successfully processed by the hardware device; and
if the network communication request is not successfully processed by the hardware device, then sending the network communication request for processing to the first network stack.

20. The computer readable medium of claim 15, wherein prior to offloading:
sending the network communication request to an IP transport offload driver coupled to a hardware driver for the hardware device; and
forwarding the network communication request from the IP transport offload driver to the hardware driver for offloading to the hardware device.

* * * * *

UNITED STATES PATENT AND TRADEMARK OFFICE
CERTIFICATE OF CORRECTION

PATENT NO. : 7,451,197 B2
APPLICATION NO. : 10/448797
DATED : November 11, 2008
INVENTOR(S) : A. R. Davis et al.

It is certified that error appears in the above-identified patent and that said Letters Patent is hereby corrected as shown below:

In the Claims

Column 12, line 20, "storinci" should read --storing--.

Column 12, line 34, "TOP" should read --TCP--.

Signed and Sealed this
First Day of July, 2014

Michelle K. Lee
*Deputy Director of the United States Patent and Trademark Office*